UNITED STATES PATENT OFFICE.

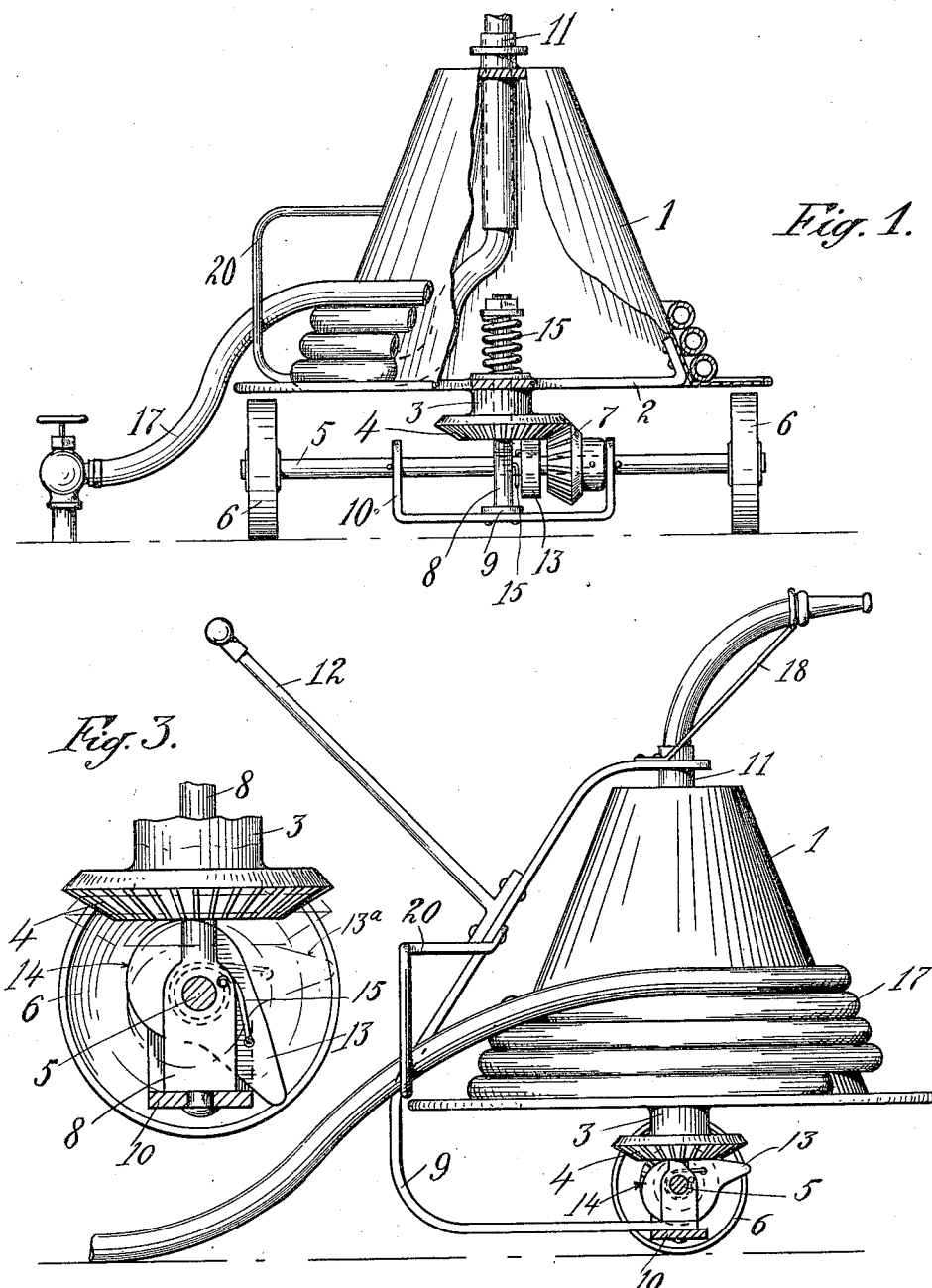

ENGBRET BERGLAND, OF MADRAS, OREGON.

HOSE-REEL.

1,064,883.　　　　　Specification of Letters Patent.　　Patented June 17, 1913.

Application filed July 31, 1912.　Serial No. 712,583.

*To all whom it may concern:*

Be it known that I, ENGBRET BERGLAND, a citizen of the United States, and resident of Madras, in the county of Crook and State of Oregon, have invented certain new and useful Improvements in Hose-Reels, of which the following is a specification.

My invention relates to a hose reel mechanism, and has for its object to provide a reel mechanism of simple and inexpensive construction.

More specifically my aim is to mount a revoluble hose reel on a movable carriage, and to provide means on said carriage, coöperating with said reel, for imparting a rotatory movement to the reel for the purpose of winding the hose on the reel, while the carriage is moving in one direction.

A further object is to embody means for disconnecting the reel from the rotating mechanism on the reverse movement of the carriage, said disconnecting means also acting as a reel brake, as will hereinafter be more fully explained.

In order to facilitate the description of my device, and to enable those versed in the art to readily construct the same, a series of drawings are annexed to the specification, the substance of the said drawing being as follows:

Figure 1 is a front elevation of a machine embodying my invention, Fig. 2 shows the machine in side elevation, and Fig. 3 is an enlarged view of parts of Fig. 2.

The hose reel of my device comprises a casing 1, rigidly mounted on a frame 2, the center of which terminates in a pendent boss 3, and on the bottom of the latter are cut bevel gear teeth 4. The carriage of my device comprises a shaft 5 having at each end an integral drive wheel 6 and an intermediate bevel pinion 7 meshing with the said bevel gear teeth 4. The shaft 5 journals at its center in a stud 8, and the latter is rotatably mounted in the boss 3, as clearly shown in Fig. 1.

From the foregoing description it is readily seen, that the rotation of the drive wheels 6 imparts a rotatory movement to the reel. The said drive wheels are caused to rotate by pushing or pulling the machine along the ground, and for this purpose a frame 9 is provided, the lower portion of which is bent to form a yoke 10 which journals on the shaft 5. The upper portion of the frame is perforated to receive a pipe 11, said pipe centrally fixed in the top of the reel casing. A suitable operating lever 12 is rigidly mounted on the frame for the purpose of facilitating the operation of the machine.

On the shaft 5, between the bevel pinion 7 and the stud 8 is loosely hung a pawl 13, said pawl having an eccentric cam portion 14 positioned to ride on the bottom surface of the boss 3. This pawl serves as a disconnecting medium between the reel and carriage.

It is noticed that the stud 8 extends well above the frame 2, and that a coil spring 15, mounted on the said stud, tends to keep the reel in position on the carriage and the bevel gears in mesh. The end thrust, due to the weight of the hose-carrying reel and the tension of the spring 15, being directed against the said pawl 13, the latter is affected in the following manner: During the forward, pushing movement of the machine the rotation of the reel-boss 3 causes the pawl to turn downward, thereby lifting the reel and disengaging the bevel gears. A light coil spring 16 may conveniently be introduced for the purpose of balancing the said pawl.

In operation the outer, free end of the hose 17 is first attached to a hydrant, the hose having previously been mounted on the reel. It is noticed that the inner, nozzle carrying end of the hose extends through a perforation in the casing, and, passing through the above mentioned pipe 11, projects above the reel and through a guide bracket 18 of the frame 9. As the machine is then pushed forward the pawl is immediately acted upon to raise the reel clear of the bevel pinion 7. The hose now unwinds by the pulling action of the end fixed on the hydrant, and the pawl, bearing against the bottom of the boss 3, creates some friction, thereby acting as a brake on the reel and causing the hose to unwind smoothly and evenly. The moment the machine is stopped and its movement reversed the tension on the pawl is relieved, the bevel gears quickly reëngage, and the hose is positively rewound. The position of the pawl during this return movement of the carriage is indicated at 13ª in Fig. 3.

On the frame is secured a loop-shaped guide 20, through which the outer end of the hose is caused to pass, and this guide aids materially in keeping the hose in place on the reel.

The cone-shaped reel casing shown in the drawings has been found to give satisfactory service, but I wish it understood that any other shape may be substituted, and that minor changes may be made in the mechanism, without thereby departing from the principle of my invention.

I claim:

1. In combination; a hose reel mounted for rotation on a wheel-truck; means on the truck for rotating the reel; and means actuated by the forward travel of the truck for releasing the reel from the said rotating means.

2. In a hose-reel mechanism, the combination with a wheel-truck and a reel mounted for rotation on said truck; of means for operatively connecting the reel with the truck wheels for simultaneous rotation; and means, operative only during the forward travel of the truck, for releasing said reel from operative connection with the truck-wheels, said means also acting as a brake on the reel when operatively disconnected.

3. In a hose truck, the combination with the truck-wheel shaft and a reel mounted for rotation on the truck; of a driving gear rigid on said shaft meshing with a gear of the reel for the purpose of imparting rotatory movement to said reel during the travel of the truck; and means on said shaft, operative only during the forward travel of the truck, for raising said reel clear of the said driving gear so as to position the reel for independent rotation.

4. In a device of the character described, the combination with a wheel-truck and a reel mounted for simultaneous rotation with the truck wheels; of an eccentric pawl loosely hung on the shaft of the truck wheels, said pawl operated by the forward rotation of the said shaft to raise the reel so as to disengage the rotating mechanism, thereby permitting the reel to become independently rotated.

5. In a device of the character described, the combination with a wheel-truck and a reel mounted for simultaneous rotation with the truck wheels; of a pawl loosely hung on the shaft of the truck wheels, said pawl having an eccentric cam surface engaging the bottom surface of the reel and operated by the forward rotation of said shaft to disengage the reel from the said shaft.

6. In a device of the character described, in combination; a wheel-truck; a hose reel rotatably hung on said truck for vertical movement on the truck; bevel gears transmitting rotatory movement from the truck-wheels to the said reel; a spring mechanism for holding said bevel gears normally in engagement; means actuated by the forward travel of the truck for raising the reel against the tension of the said spring mechanism, thereby disengaging said bevel gears, said means acting as a brake on the reel when elevated.

7. A wheel-truck, a hose reel rotatably hung on said truck, said reel having a central tube projecting at the top through which the nozzle-carrying end of the hose is caused to extend, a guide on the truck frame for supporting said hose end so as to direct the stream issuing from the nozzle, means for transmitting the rotatory movement of the truck-wheels to the reel, and means for disconnecting said transmitting means during the forward travel of the truck.

8. In a device of the character described, in combination; a wheel-truck, the frame of said truck having a central stud and an alined perforation at the top; a hose reel mounted to rotate on said stud, said reel having a central tube guided in said perforation; a nozzle guide on top of the frame, the devices designed to lead the nozzle end of the hose through the said tube and guide; bevel gears transmitting the rotations of the truck-wheel to the reel; a spring mechanism on said stud for retaining the reel in position for simultaneous rotation; and means actuated during the forward travel of the truck for raising the reel on the stud against the tension of said spring mechanism, thereby allowing of independent rotation of the reel.

9. In a device of the character described, the combination with a wheel-truck and a reel mounted for simultaneous rotation with the truck wheels; of means for guiding the hose through the center of the reel; spring mechanism for retaining the reel in position for simultaneous rotation; an eccentric pawl acted upon by the forward travel of the truck to raise said reel against the tension of the said spring mechanism, thereby positioning the reel for independent rotation; and means for directing and guiding the nozzle end of the hose projecting through the top of the reel.

In testimony whereof I have hereunto affixed my signature.

ENGBRET BERGLAND.

In presence of—
J. A. BACKSTRAND,
DAVID E. LOFGREN.